United States Patent
Chengalvarayan et al.

(10) Patent No.: US 8,423,362 B2
(45) Date of Patent: Apr. 16, 2013

(54) IN-VEHICLE CIRCUMSTANTIAL SPEECH RECOGNITION

(75) Inventors: Rathinavelu Chengalvarayan, Naperville, IL (US); Timothy J. Grost, Clarkston, MI (US); Edward J. Abeska, Ferndale, MI (US)

(73) Assignees: General Motors LLC; GM Global Technology Operations LLC, Detroit, MI (US)

( * ) Notice: Subject to any disclaimer, the term of this patent is extended or adjusted under 35 U.S.C. 154(b) by 689 days.

(21) Appl. No.: 11/963,103

(22) Filed: Dec. 21, 2007

(65) Prior Publication Data
US 2009/0164216 A1     Jun. 25, 2009

(51) Int. Cl.
*G10L 15/04*     (2006.01)
(52) U.S. Cl.
USPC ............ 704/251; 704/275; 704/270; 704/231

(58) Field of Classification Search ............ 704/275, 704/231, 270, 273, 270.1, 235, 272, 233, 704/251; 340/438
See application file for complete search history.

(56) References Cited

U.S. PATENT DOCUMENTS

| | | | |
|---|---|---|---|
| 4,501,012 A * | 2/1985 | Kishi et al. | 704/275 |
| 7,170,400 B2 * | 1/2007 | Cowelchuk et al. | 340/438 |

* cited by examiner

*Primary Examiner* — Huyen X. Vo
(74) *Attorney, Agent, or Firm* — Anthony Luke Simon; Reising Ethington P.C.

(57) ABSTRACT

A method of circumstantial speech recognition in a vehicle. A plurality of parameters associated with a plurality of vehicle functions are monitored as an indication of current vehicle circumstances. At least one vehicle function is identified as a candidate for user-intended ASR control based on user interaction with the vehicle. The identified vehicle function is then used to disambiguate between potential commands contained in speech received from the user.

18 Claims, 4 Drawing Sheets

IN-VEHICLE CIRCUMSTANTIAL SPEECH RECOGNITION

TECHNICAL FIELD

This invention relates to speech signal processing and, more particularly, to automated speech recognition (ASR) for controlling vehicle functions.

BACKGROUND OF THE INVENTION

ASR technologies enable microphone-equipped computing devices to interpret speech and thereby provide an alternative to conventional human-to-computer input devices such as keyboards or keypads. A typical ASR system includes several basic elements. A microphone and an acoustic interface receive an utterance of a word from a user, and digitize the utterance into acoustic data. An acoustic pre-processor parses the acoustic data into information-bearing acoustic features. A decoder uses acoustic models to decode the acoustic features into utterance hypotheses. The decoder generates a confidence value for each hypothesis to reflect the degree to which each hypothesis phonetically matches a subword of each utterance, and to select a best hypothesis for each subword. Using language models, the decoder concatenates the subwords into an output word corresponding to the user-uttered word. Users of ASR systems utter requests to an ASR system to control different vehicle devices, or different functions of one of the vehicle devices.

One problem encountered with ASR-enabled vehicle function control is that although such a system may correctly decode a user's input speech, it may incorrectly apply the recognized speech to an unintended vehicle function. In other words, current ASR-enabled vehicle function controls have significant difficulties disambiguating between speech for one vehicle function and speech for some other vehicle function. For example, a user may say "let me hear some traffic" to have a vehicle radio play music from the 1960's rock band Traffic, but the ASR enabled vehicle controller may misinterpret the request and have another vehicle device play a roadway traffic report instead. Accordingly, users of ASR enabled vehicles become frustrated with this situation.

SUMMARY OF THE INVENTION

The present invention provides a method of circumstantial speech recognition in a vehicle. In accordance with one embodiment, the method includes the steps of:

(a) monitoring a plurality of parameters associated with a plurality of vehicle functions as an indication of current vehicle circumstances; and (b) identifying at least one vehicle function as a candidate for user-intended ASR control when at least one of the monitored plurality of parameters associated with at least one of the plurality of vehicle functions meets predetermined criteria.

In accordance with another aspect of the invention, there is provided a method of circumstantial speech recognition in a vehicle based on user interactivity with the vehicle. The method includes the steps of:

monitoring a plurality of vehicle devices for interaction by a user;

identifying a vehicle device for user-intended ASR control based on user interaction with the vehicle device;

receiving speech from the user; and disambiguating between two or more possible commands contained in the speech based at least in part on the identified vehicle device.

These methods enable an ASR system to increases the likelihood of applying recognized speech to control a vehicle function intended for use by a user.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
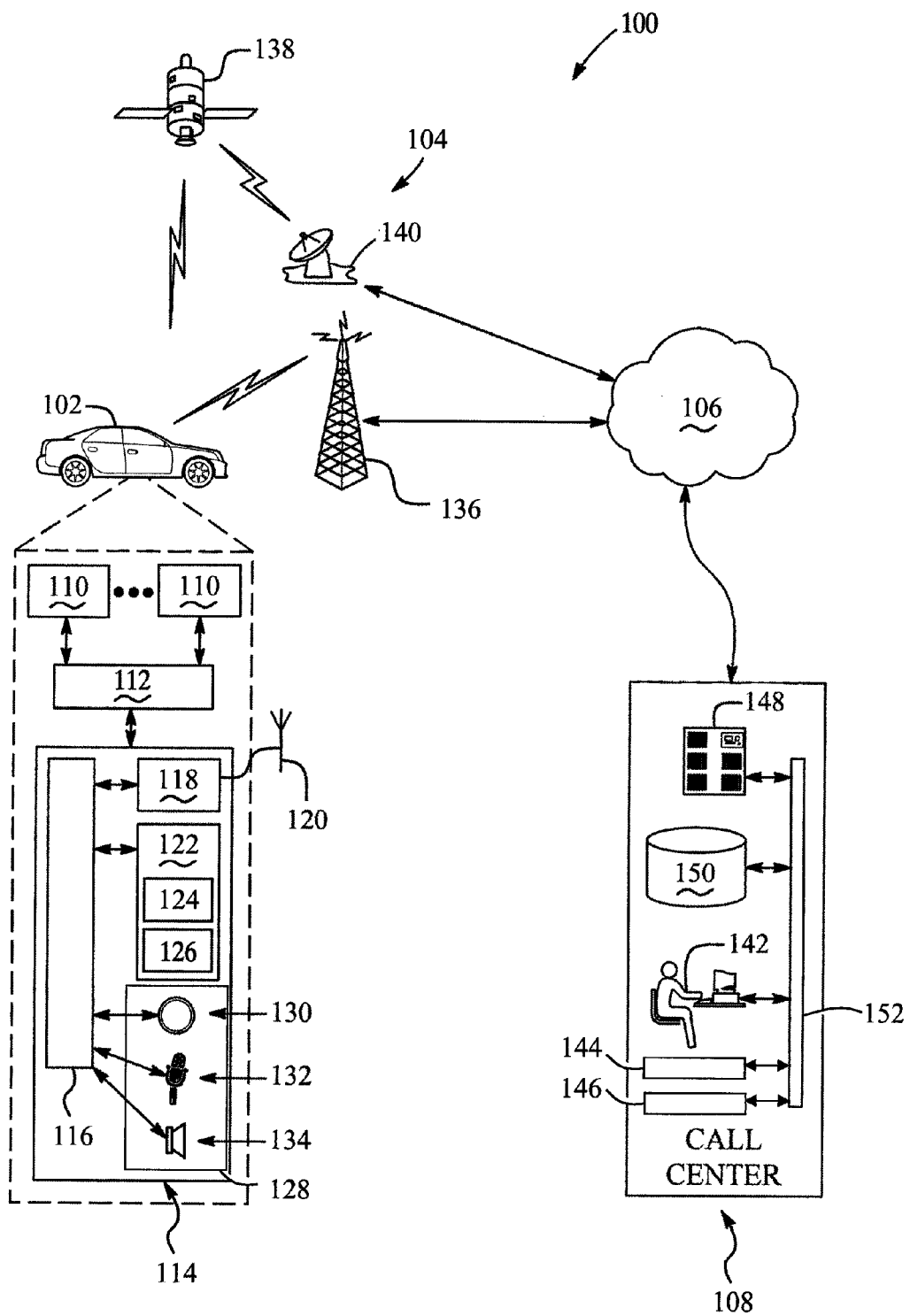
FIG. 1 is a block diagram depicting an example of a telematics system that can be used in conjunction with a method of in-vehicle circumstantial speech recognition.

An exemplary operating environment is illustrated in FIG. 1, and can be used to implement a presently disclosed method of circumstantial speech recognition. The method can be carried out using any suitable telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server (not shown) in communication with the vehicle 102 and/or the call center 108 for providing Internet services thereto.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108. Also, the system 100 enables data communication between the vehicle 102 and a web server or call center 108 for various purposes such as transmitting and/or receiving data such as voice messages, email, news, Internet content, and/or the like.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of circumstantial speech recognition, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of circumstantial speech recognition. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of circumstantial speech recognition, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
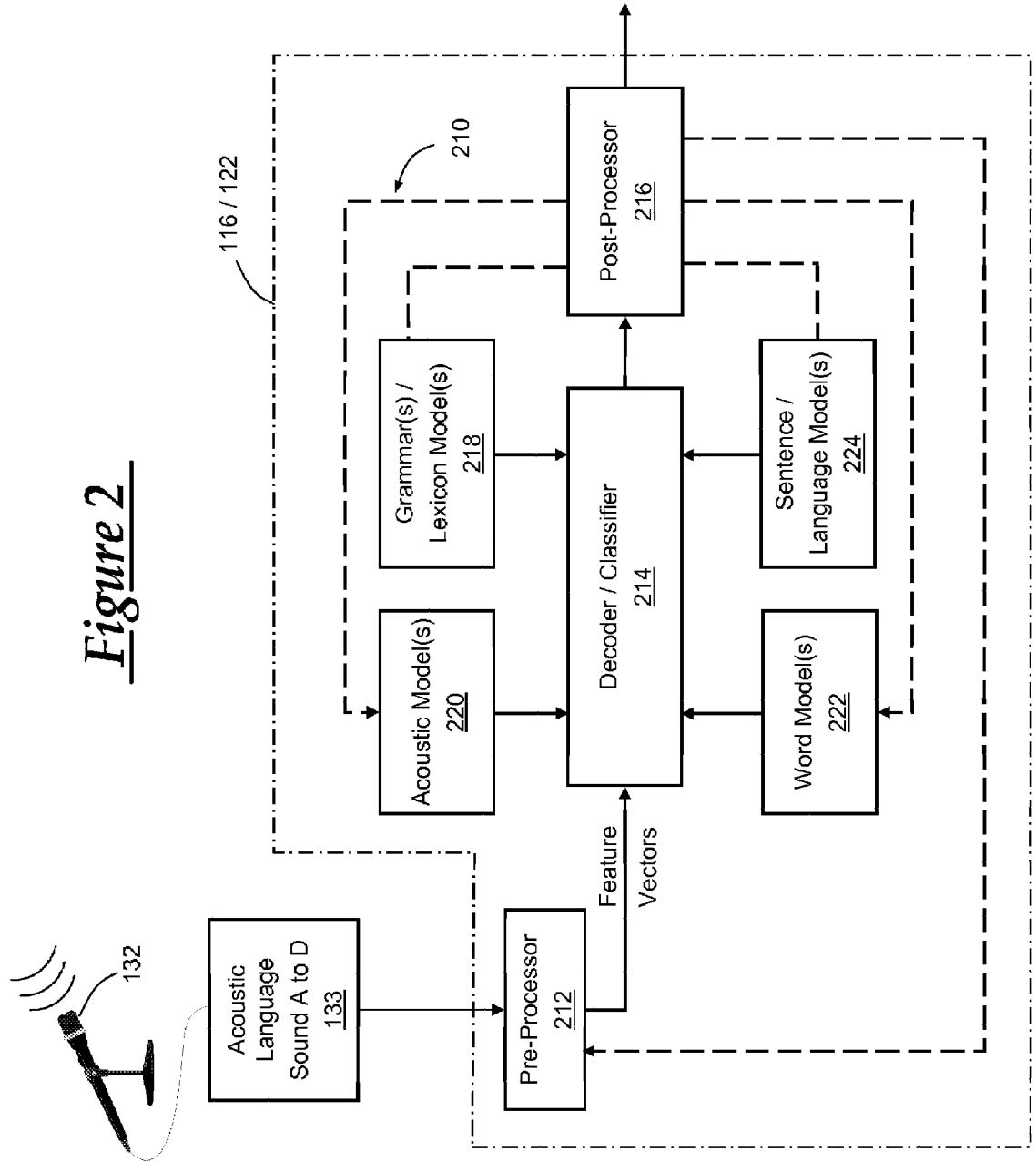
FIG. 2 is a block diagram illustrating an example automatic speech recognition architecture that can be embedded within the telematics system of FIG. 1 and used to implement exemplary methods of speech recognition.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the telematics memory 122 and then processed by the telematics processor 116 or can be processed as they are initially received by the processor 116 in real-time.

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method of Circumstantial Speech Recognition

A method of circumstantial speech recognition is provided herein and can be carried out as one or more computer programs using the architecture of the ASR system 210 within the operating environment of the telematics system 100 described above. Those skilled in the art will also recognize that the method can be carried out using other ASR systems within other operating environments.

The method is provided to improve performance of ASR enabled vehicle controllers by providing better disambiguation of recognized speech based on particular circumstances occurring within the vehicle at the time of speech recognition. Circumstances occurring within the vehicle at any given time can provide insight into a user's intent in using ASR. In particular, a user's own actions in the vehicle can provide particularly good insight into the user's intent. In other words, the method evaluates the context in which a user's speech is being recognized and applied.

Figure 3:
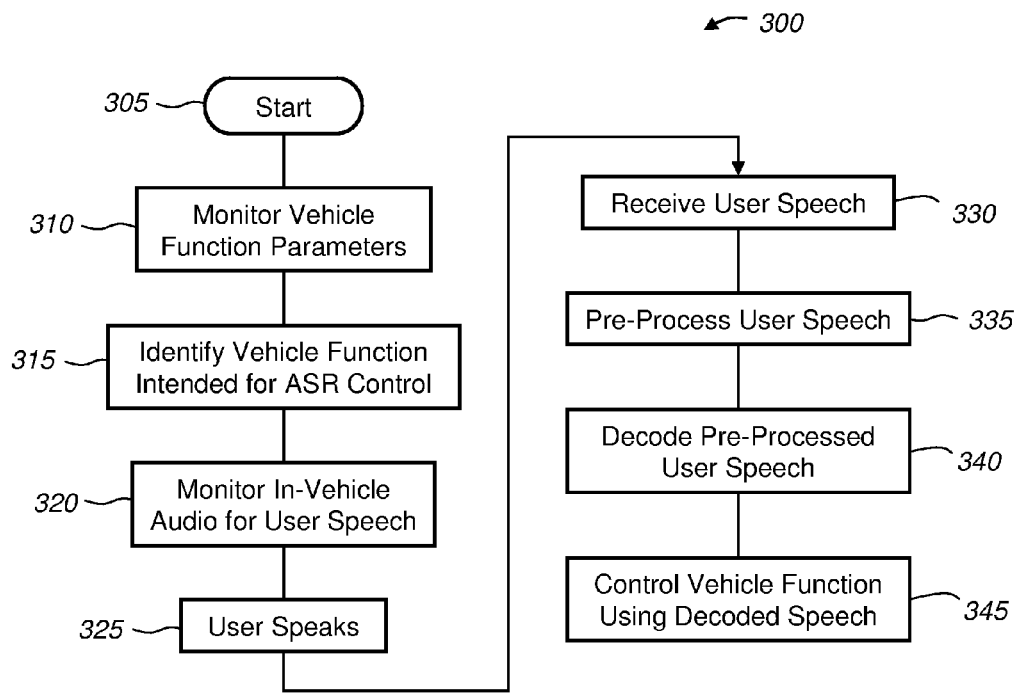
FIG. 3 is a flow chart of an embodiment of an exemplary method of in-vehicle circumstantial speech recognition that can be performed using the telematics system of FIG. 1.

In general, a variety of parameters associated with a variety of vehicle functions are monitored as an indication of current vehicle circumstances. Also, a vehicle function is identified as a candidate for user-intended ASR control when a monitored vehicle parameter associated with the vehicle function meets predetermined criteria. Accordingly, vehicle controller performance can be increased by such an improvement because it can increase the likelihood that recognized speech will be applied to a user-intended vehicle function. FIG. 3 illustrates an exemplary circumstantial speech recognition method 300, as discussed in detail below.

At step 305, the method 300 is started in any suitable fashion. For example, an ASR session can be initiated by a user depressing the activation pushbutton 130 of the telematics unit 114 of the telematics system 100 to begin a session in which the user inputs verbal requests that can be interpreted by the telematics unit 114 while operating in speech recognition mode. Using the speaker 134, the telematics unit 114 can acknowledge the pushbutton activation by playing a sound or providing a verbal request for a command from the user or occupant. According to another aspect, the ASR system 210 can continuously and passively monitor for user speech such that a user need not separately and actively initiate ASR via manual button press. This type of monitoring and automatic ASR activation is known to those skilled in the art.

At step 310, a plurality of parameters associated with a plurality of vehicle functions are monitored as an indication of current vehicle circumstances. For example, and referring to FIG. 4, any vehicle devices 410 may be used and any parameters associated in any way with those devices 410 can be monitored. As used herein, the phrase "vehicle functions" can include different vehicle devices or different functions of one or more of the different vehicle devices.

Figure 4:
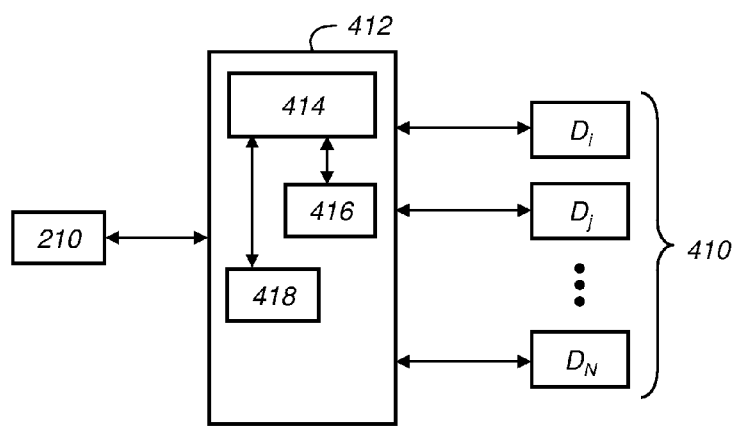
FIG. 4 is a block diagram of an example of a vehicle controller and associated vehicle devices that can be controlled using an automatic speech recognition system.

As shown in FIG. 4, the vehicle devices 410 may be in communication with any suitable vehicle controller 412, which may include one or more suitable processors 414, any suitable type(s) of memory 416 coupled to the processor(s) 414, and suitable input/output interfaces 418 coupled between the processor(s) 414 and the vehicle devices 410 and the ASR system 210. The vehicle controller 412 can be any computing device(s) of any kind carried by a vehicle, such as one or more of an engine or powertrain controller, instrument panel controller, and/or the like.

The vehicle function parameters can be monitored by the vehicle controller 412 using any suitable hardware, software, and/or firmware. For example, the vehicle devices 410 can include integrated sensors (not shown) or separate sensors (not shown). In another example, the controller 412 may poll processors or memory of the vehicle devices 410 for data indicative of vehicle function parameters such as on/off status of a device, or data associated with user interaction with a device such as connected/unconnected status of an external device, elapsed time since a device was last adjusted by a user, and any other data.

Exemplary vehicle devices can include media devices such as radios, televisions, video players, and the like; climate control devices such as air conditioners, heaters, fans, vents, and the like; door locks; windows; mirrors; steering wheels; seats; window wipers; interior and exterior lights; clocks; telecommunications devices such as telephones, telematics units, and the like; navigation devices such as global positioning system (GPS) heads, receivers, and the like; information devices such as Internet browsers or the like; window defrosters; seat heaters; fuel door releases; trunk and hood releases; trip computers; and the like, just to name a few.

Exemplary monitored parameters can include a status of a connection between a vehicle device and an external device, such as an MP3 player that has just been connected to a vehicle radio in a wireless fashion or otherwise. Also, a temperature value sensed by a temperature sensor of a climate control system can be monitored. Other example parameters can include on/off signals of devices, audio volume and/or volume settings, temperatures and/or temperature settings, device speeds and/or speed settings, device positions and/or position settings, light levels and/or level settings, time and/or time settings, and/or vehicle position and/or position settings to name just a few. Also, just the parameters themselves may be monitored, or the parameters as a function of some other parameter may be monitored. For example, the parameters as a function of time may be monitored such as a connection status of one electronic device relative to another in combination with elapsed time after a connection or disconnection.

At step 315, and referring again to FIG. 3, at least one vehicle function is identified for user-intended ASR control. For example, one or more of the vehicle functions from step 310 can be identified as being intended by a user for ASR control, such as when at least one of a monitored plurality of parameters associated with at least one of a plurality of vehicle functions meets predetermined criteria.

In one specific example, a vehicle radio can be identified as a candidate for ASR control when a user has recently connected an MP3 player to the vehicle radio either by wire, or by placing a wireless communication enabled MP3 player in suitable proximity to a wireless communication enabled vehicle radio, or the like. In such a circumstance, it may be inferred that if any user speech is received within a predetermined amount of time after the connection, then the user desires to vocally control the MP3 player and not some other vehicle device such as a telematics system or a climate control system.

In another particular example, if vehicle interior temperature is monitored and determined to be above a certain high temperature threshold, then an air conditioner can be identified as a candidate for speech recognition control.

Thus, the predetermined criteria may be an absence or presence of a device connection or other event, a device on or off signal, or another status signal of a device such as a temperature value, fan setting, window opening amount, or the like. Instead or additionally, the predetermined criteria may be time related such as an elapsed time after an event has occurred such as user interaction with a vehicle device. The predetermined criteria may include a single threshold parameter value, a range of values, or the like.

At step 320, audio in a vehicle can be monitored by an ASR system for user speech in any suitable manner. For example, the ASR system 210 can be adjusted such that the microphone 132 is activated and ready to receive user utterances.

At step 325, a user can be prompted to utter a request or otherwise can begin speaking to a listening ASR system. In one example, the ASR system 210 may play a recorded prompt such as "Ready" or may play a beep, flash a light, or the like. In another example, again, the ASR system 210 can continuously monitor for user speech. In either case, the user can input a request, for instance, by saying a command such as "Dial" or "Play" or "Activate" followed by a variable such as a particular phone number or a name of a song or a device function.

At step 330, user speech is received by the ASR system. For example, utterances from a user can be received by the ASR system 210 using the activated microphone 132, processor 116, and memory 122 of the ASR system 210. Once received, the converter 133 can convert the analog user speech into acoustic data, which can be saved to the memory 122.

At step 335, the received user speech can be pre-processed. For example, the acoustic data from step 330 can be pre-processed by the pre-processor 212 of the ASR system 210 to extract any suitable acoustic features therefrom.

At step 340, the pre-processed user speech is decoded. For example, acoustic features corresponding to a user's utterance from step 335 can be decoded by the decoder 214 of the ASR system 210 to produce any suitable output including recognition results, hypotheses, and/or the like. More specifically, the decoder 214 can decode the pre-processed acoustic data using one or more of the speech recognition models 218, 220, 222, 224.

In a particular example, the models 218, 220, 222, 224 can each include a plurality of different model versions corresponding to a plurality of different vehicle functions. More specifically, a plurality of different grammar models 218 can be used for a plurality of different vehicle functions such that, for example, a radio-specific grammar model can correspond to the radio, a telematics-specific grammar model can correspond to the telematics unit, and the like. Similarly, a plurality of different device-specific acoustic, word, and sentence models can be associated with corresponding vehicle functions.

At step 345, a vehicle function is controlled using recognized speech data. For example, the vehicle function identified in step 315 can be controlled using the speech data decoded in step 340. In a particular example, a vehicle radio can be controlled using speech data received within a predetermined time after a user connects an MP3 player to the radio. In another specific example, a vehicle climate control system can be controlled using speech data received when the temperature in a vehicle is above or below predetermined limits.

As described above, the process of FIG. 3 can utilize different speech recognition models selected based on an identified vehicle function with which the vehicle operator may be interacting. This can provide disambiguation between received speech as a part of the speech recognition process itself. That is, by selecting a grammar model based on an identified vehicle function, the particular model selected will interpret the received speech in a context appropriate to the identified vehicle function and, in doing so, will inherently assist in disambiguation of the speech.

Figure 5:
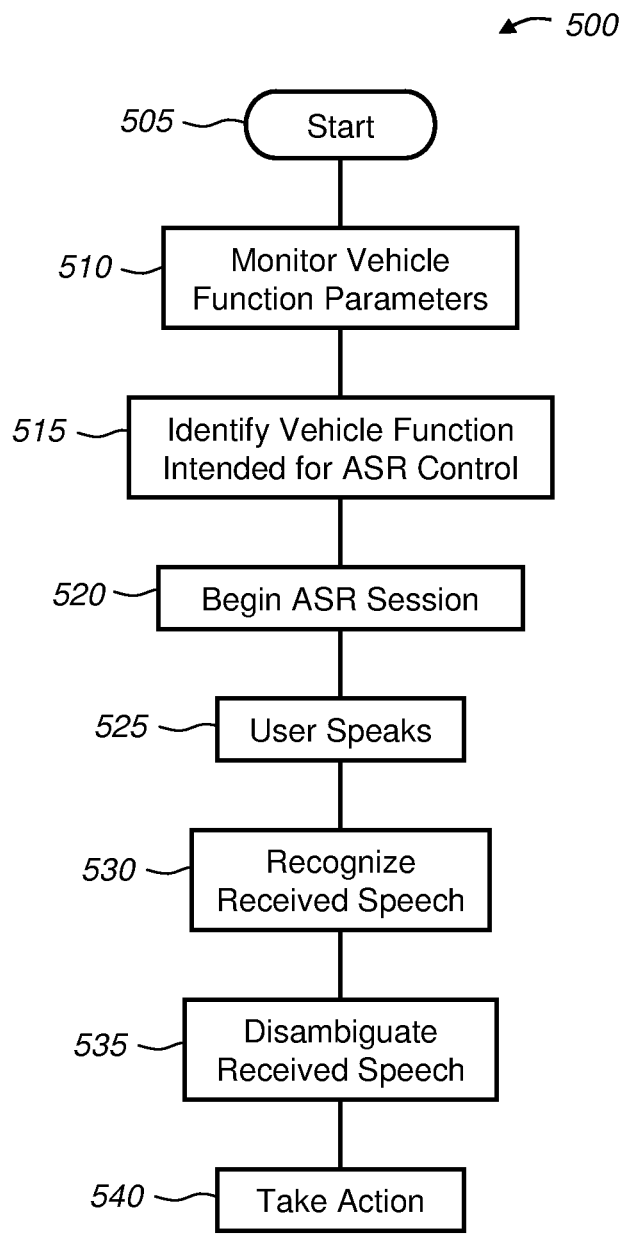
FIG. 5 is a flow chart of another embodiment of a method of in-vehicle circumstantial speech recognition that can be performed using the telematics system of FIG. 1.

In another embodiment, shown in FIG. 5, speech recognition is carried out without regard to any identified vehicle function; rather, the identified vehicle function is used when needed after speech recognition to disambiguate the received speech between two or more candidate possibilities. The method 500 starts at step 505, following which it begins monitoring for vehicle function parameters at step 510. When the process identifies a vehicle function that may impact ASR control (e.g., identifies a vehicle device with which the user has interacted), as shown at step 515, it records this occurrence for subsequent use in the event the operator begins an ASR session. For example, if a user connects an MP3 player into the audio system, that event is noted by the system. Then, once an ASR session is begun, step 520, and the user has uttered a command, at step 525, the speech recognition system 210 processes the received speech to recognize the individual words, as indicated by step 530. For example, where the user says "let me hear some Traffic," ASR system 210 processes the speech and recognizes the relevant portions "hear traffic." At this point, disambiguation is carried out based on the identified (and stored) vehicle function, which in this example was the connecting of a music player to the audio system. This is shown at step 535. Thus, in this example, the recognized words "hear traffic" are taken to be a command to play music by the group Traffic, rather than to be a command to obtain and audible present a local traffic report. Based on this disambiguation, the system then takes proper action, as indicated at step 540. This action can be, for example, either to carry out the selected (disambiguated) command automatically, or to request confirmation of the selected command from the user before proceeding. Once the appropriate action is taken, the process ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, disambiguation of the received speech need not be based solely on the identified vehicle function or device, but can in part be based on that and on other factors. For example, in FIG. 3 where the identified vehicle function can be used to select among different available speech recognition models, the selection of an appropriate model can also be based on other factors, such as to account for regional dialects. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of circumstantial speech recognition in a vehicle, the method comprising the steps of:
 detecting user interaction with a particular one of a plurality of different vehicle devices located in the vehicle;
 identifying the particular vehicle device as a candidate for user-intended automatic speech recognition (ASR) control based on receiving speech from the user within an elapsed time following the detection of the user interaction; and then
 carrying out speech recognition on the received speech using an automatic speech recognition system that is configured based on the identified vehicle device.

2. The method set forth in claim 1, wherein the step of carrying out speech recognition further comprises the steps of:
 receiving user speech;
 pre-processing the user speech; and
 decoding the pre-processed speech into recognized speech data; and
 wherein the method further comprises the step of controlling the identified vehicle device using the recognized speech data.

3. The method set forth in claim 2, wherein the pre-processed speech is decoded by applying at least one speech recognition model associated with the identified vehicle device.

4. The method set forth in claim 1, wherein the plurality of parameters includes a parameter that indicates occurrence of a user initiated event.

5. The method set forth in claim 4, wherein the user interaction includes connection of an external device to a vehicle device.

6. The method set forth in claim 1, wherein the automatic speech recognition system is located in the vehicle.

7. The method set forth in claim 1, wherein the speech recognition is carried out using at least one reference pattern associated with the identified vehicle device.

8. A method of circumstantial speech recognition in a vehicle based on user interactivity with the vehicle, the method comprising the steps of:
    receiving speech from a user in a vehicle via a microphone pre-processing the received speech;
    decoding the pre-processed speech into recognized speech data using an automatic speech recognition system;
    monitoring a plurality of different vehicle devices for interaction by the user using at least one processor located in the vehicle; and then
    identifying a vehicle device for user-intended automatic speech recognition (ASR) control if the user has interacted with the identified vehicle device within a predetermined elapsed time; and then
    controlling the identified vehicle device using the recognized speech data.

9. The method set forth in claim 8, wherein the pre-processed speech is decoded by applying at least one speech recognition model associated with the identified vehicle device.

10. The method set forth in claim 8, wherein identifying step further comprises detecting connection of an external device to the identified vehicle device.

11. The method set forth in claim 8, wherein the automatic speech recognition system is located in the vehicle.

12. The method set forth in claim 8, wherein the identifying step further comprises the step of identifying a vehicle device for user-intended ASR control if the user has interacted with the identified vehicle device within a predetermined time of receiving the speech.

13. A method of circumstantial speech recognition in a vehicle based on user interactivity with the vehicle, the method comprising the steps of:
    monitoring a plurality of different vehicle devices for interaction by a user using at least one processor located in the vehicle; and then
    identifying a vehicle device for user-intended automatic speech recognition (ASR) control based on user interaction with the vehicle device; and then
    receiving speech from the user via a microphone located in the vehicle, the received speech being received within an elapsed time following the user interaction; and
    disambiguating between two or more possible commands contained in the speech based at least in part on the user interaction with the identified vehicle device.

14. The method set forth in claim 13, wherein the disambiguating step further comprises recognizing the speech using a speech recognition model selected based at least in part on the user interaction with the identified vehicle device.

15. The method set forth in claim 13, wherein the disambiguating step further comprises recognizing the speech using an ASR system and thereafter determining which of two or more potential commands is intended by the user based at least in part on the user interaction with the identified vehicle device.

16. The method set forth in claim 13, further comprising the step of controlling the identified vehicle device using the recognized speech data.

17. The method set forth in claim 13, further comprising the step of pre-processing the received speech before the disambiguating step.

18. The method set forth in claim 13, wherein the monitoring step further comprises monitoring for connection of an external device to one of the vehicle devices.

* * * * *